US005829647A

United States Patent [19]

Miller

[11] Patent Number: 5,829,647

[45] Date of Patent: Nov. 3, 1998

[54] METERING GEARHEAD DISPENSING APPARATUS HAVING SELECTIVELY POSITIONABLE GEAR PUMPS

[75] Inventor: Scott R. Miller, Roswell, Ga.

[73] Assignee: Nordson Corporation, Westlake, Ohio

[21] Appl. No.: 685,070

[22] Filed: Jul. 23, 1996

[51] Int. Cl.[6] ........ G01F 11/00

[52] U.S. Cl. ........ 222/274; 222/333

[58] Field of Search ........ 222/274, 330, 222/333; 418/199, 200, 202, 210, 212

[56] References Cited

U.S. PATENT DOCUMENTS

| | | | |
|---|---|---|---|
| 744,175 | 11/1903 | Dedreux | 222/274 |
| 2,474,254 | 6/1949 | Kauffman | 91/12 |
| 2,533,320 | 12/1950 | Hull et al. . | |
| 2,818,023 | 12/1957 | Lundstrom . | |
| 2,902,935 | 9/1959 | Dinnison et al. . | |
| 3,028,811 | 4/1962 | Rothenmeyer . | |
| 3,314,369 | 4/1967 | Yonei et al. . | |
| 3,489,321 | 1/1970 | Kirschmann | 222/274 X |
| 3,498,230 | 3/1970 | Schippers . | |
| 3,649,147 | 3/1972 | Fritsch . | |
| 4,137,023 | 1/1979 | Moked et al. . | |
| 4,259,045 | 3/1981 | Teruyama | 418/212 X |
| 4,437,827 | 3/1984 | Moderlak et al. . | |
| 4,651,788 | 3/1987 | Grosskreuz et al. | 222/274 |
| 4,765,272 | 8/1988 | Mladota . | |
| 4,983,109 | 1/1991 | Miller et al. . | |

FOREIGN PATENT DOCUMENTS

| | | |
|---|---|---|
| 0559486 A1 | 9/1993 | European Pat. Off. . |
| 04 059302A | 2/1992 | Japan . |
| 04 191484 A | 7/1992 | Japan . |
| 06 320601 A | 11/1994 | Japan . |

*Primary Examiner*—Gregory L. Huson

*Attorney, Agent, or Firm*—Wood, Herron & Evans, L.L.P.

[57] ABSTRACT

A fluid dispensing apparatus utilizing a through shaft metering gear pump. The metering gearhead includes an elongated drive shaft which receives multiple, self-contained gear pumps in a sliding manner. The gear pumps of the apparatus are connected to a fluid distribution manifold at a selected spacing with an inlet of each gear pump being connected to a central supply passage within the manifold and at least one outlet of each pump connected to a manifold outlet passage which may lead to suitable dispensing nozzles or guns. Each gear pump includes at least first and second gears with the drive gear being connected to the elongated drive shaft by way of a hollow shaft which provides both a sealing function and drive transfer function. The hollow shaft is keyed to the drive shaft to allow the pump body to be slid into the desired position.

34 Claims, 1 Drawing Sheet

METERING GEARHEAD DISPENSING APPARATUS HAVING SELECTIVELY POSITIONABLE GEAR PUMPS

BACKGROUND OF THE INVENTION

The present invention generally relates to fluid dispensing apparatus and, more specific ally, to metering gearhead dispensing apparatus useful in dispensing highly accurate volumes of fluid onto a substrate.

Metering gear pumps operate by squeezing out fluid between meshing gears. Typically, the gears are mounted within stacked plates which are appropriately ported to receive fluid between the gears and discharge the fluid usually in several streams depending on the number of gears and outlet ports. Several of the gears may be stacked on a single shaft to provide multiple metered streams. One conventional design utilizes a central shaft and multiple gear plates and adjacent port plates. The fluid stream enters through a front plate and travels through the multiple stacked gear plates and port plates to be distributed out several outlet ports also on the front side. Another design also uses stacked plates on a single drive shaft with a gear plate sandwiched between a port plate and a wear plate. In this design, the fluid enters the port plate and is also discharged from the port plate after passing between the meshing gears.

Conventional metering gear pumps place limits on the designs of metering gearhead dispensing systems. Typically, the conventional gear pumps add significant cost and complexity to the overall dispensing system. For example, when multiple output streams are required at spaced apart locations on a moving production line, complex drill patterns are required in manifolds and transition plates of the dispensing apparatus to feed the multiple metered streams from the gear pump or gear pumps to the spaced apart dispensers. This is the case because the multiple streams exiting the gear pump are generally not at the required spacing when exiting from an end plate or front side of the gear pump. A gear pump may be constructed to have output streams at or close to the required spacing, however, this adds further costs to the system and results in a gear pump solely dedicated to that application.

Other problems associated with conventional gear pumps involve the need to stock many different varieties of gear pumps to accommodate a corresponding variety of applications. Conventional gear pumps are usually manufactured with one, two, four, eight, sixteen or thirty-two output streams. To accommodate all applications, all of these varieties may have to be maintained in inventory. Also, if a particular application only requires thirteen output streams, for example, a sixteen stream pump may be used but three streams would be unused or "wasted". Conventional gear pumps are also rather inflexible when it comes to designing a system requiring different output volumes in different output streams.

U.S. Pat. No. 4,983,109 issued in the name of Miller et al. and assigned to the assignee of the present invention illustrates one system utilizing conventional metering gear pumps. This system uses four eight stream pumps mounted on a manifold. The pump is of the type described above in which eight streams of fluid are discharged from an end plate. The pumps are simultaneously driven through a relatively complex transmission. Each of the thirty-two outlet streams must be connected with a respective nozzle outlet. Therefore, a complex series of drilled ports are formed within a manifold and transition plate connected between the metering gear pumps and the nozzle outlets.

Another manner of providing desired spacing of outlets in a metering gearhead-type dispensing system is to incorporate the metering gear pumps into the dispensing apparatus directly at the required spacing. Such a system is disclosed in U.S. Pat. No. 4,765,272. This system, however, requires customized design and machining of a slot die head to accept the gears at different locations along the length of the head.

It would therefore be desirable to provide a metered dispensing apparatus which includes nozzle or other outlets at a required spacing but with more simplified design and machining requirements. It would also be advantageous to provide such metered dispensing apparatus which is compact, versatile to many applications and easily modifiable to different applications.

SUMMARY OF THE INVENTION

The present invention provides a metering gearhead dispensing apparatus including a plurality of self contained gear pumps spaced apart along a single drive shaft. The gear pumps are fixed to a fluid distribution manifold preferably at desired dispensing positions. Each gear pump has one fluid inlet connected to a central supply passage in the manifold and at least one fluid discharge outlet connected to a corresponding discharge outlet in the manifold which leads to a dispensing orifice. The dispensing orifice may be further connected to a suitable nozzle outlet. The gear pumps are simultaneously driven by a single, elongated shaft.

The elongated shaft is mounted for rotation to a suitable support and each metering gear pump may be slid along the shaft and spaced as desired on the shaft. The gear pumps each include a gear body having an inlet passage and an outlet passage in communication with first and second engaging gears. The first gear is a drive gear which is mounted for rotation with the elongated shaft. The gear body further includes a hollow shaft received through the first gear and disposed between the first gear and the elongated shaft. The hollow shaft is connected for rotation with both the first gear and the elongated shaft to transfer rotation from the elongated shaft to the first gear. The hollow shaft is connected to the elongated shaft by the key and keyway structure which allows the gear pump to slide along the elongated shaft to the appropriate position with respect to the manifold. Seals are disposed on opposite sides of the drive gear and engage the hollow shaft to prevent leakage of fluid from the gear pump. As a result, seals need not be engaged with the elongated shaft and the keyway thereof.

The gear pump body is formed from two side plates and an intermediate gear plate. The gear plate receives the first and second gears for rotation therein. Inlet and outlet passages are contained in the gear plate and side plates to respectively connect with the fluid dispensing manifold of the dispensing apparatus. The side plates seal the fluid within the gear housing or fluid chamber of the gear plate. The seals disposed on opposite sides of the drive gear are preferably contained within the two side plates.

The present invention provides a more compact overall design for a dispensing apparatus utilizing metering gear pumps. The metering gearhead of the invention also requires much less complicated porting in the fluid dispensing manifold of the system. Moreover, the invention reduces the variety of pump designs necessary to fulfill a wide range of applications and provides for a more flexible mix of pump capacities. Finally, the hollow shaft style metering gear pump simplifies the drive and power distribution of the system. These and other advantages and objectives of the invention will become readily apparent upon review of the following detailed description of the preferred embodiment taken along with the accompanying drawings.

DETAILED DESCRIPTION OF THE PREFERRED EMBODIMENT

Figure 1:
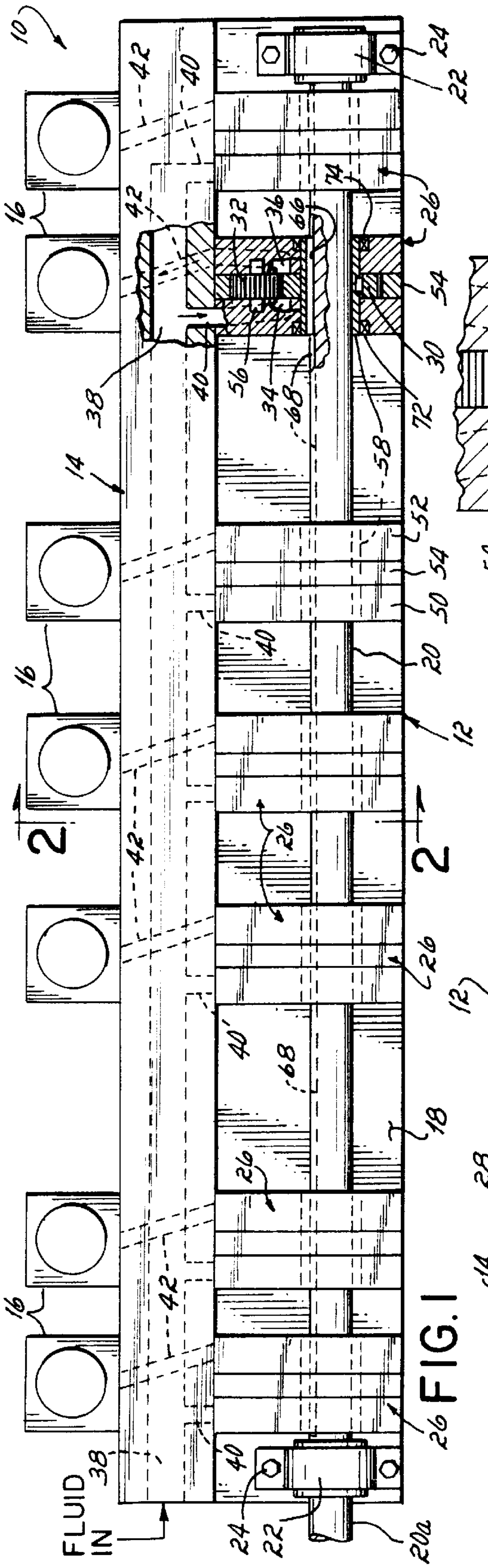
FIG. 1 is a top view of a metering gearhead dispensing apparatus of the present invention partially fragmented to show details of one gear pump.

Referring first to FIG. 1, a dispensing apparatus or gearhead 10 constructed in accordance with the present invention generally includes a metering gear pump assembly 12 connected to a fluid distribution manifold 14 having a plurality of dispensing guns 16. An air manifold 18 is also connected to fluid distribution manifold 14 to supply pressurized air to dispensing guns 16 through appropriate ports (not shown). The pressurized air is used in a conventional manner to operate dispensing guns 16 in an ON/OFF fashion and, as this does not relate to the present invention, details of the air manifold and dispensing guns 16 are not shown. Their details may, for example, be understood from U.S. Pat. No. 4,785,996, assigned to the assignee of this invention and fully incorporated by reference herein.

Metering gear pump assembly 12 includes an elongated shaft 20 mounted for rotation in a pair of journals 22 secured to a support, which may be air manifold 18 as shown or manifold 14, by suitable fasteners 24. A plurality of spaced apart gear pumps 26 are mounted to elongated shaft 20 to form assembly 12. Shaft 20 includes an end **20*a* which may be connected to a suitable drive (not shown) for rotation. As further shown in FIG. 2, each gear pump 26 is fastened at a selected location to fluid distribution manifold 14 by bolts 28. As will be further appreciated, the selected location preferably corresponds to the spacing and location of the dispensing guns 16 to simplify porting through manifold 14**.

Figure 2:
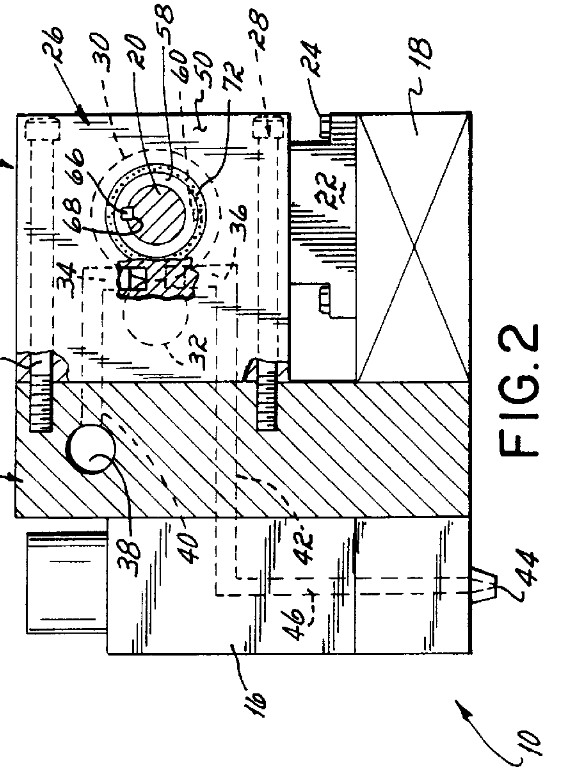
FIG. 2 is a cross sectional view taken along line 2—2 of FIG. 1.

Still referring to FIGS. 1 and 2, each gear pump 26 comprises a self contained body which internally mounts at least first and second meshing gears 30, 32 for rotation. First and second gears 30, 32 are operable to pump fluid from an inlet 34 of pump 26 to an outlet 36 of pump 26. Fluid, such as hot melt adhesive, enters inlet 34 by way of a central supply passage 38 in fluid distribution manifold 14. Specifically, a plurality of gear pump supply passages 40 extend between central supply passage 38 and each of the respective pump inlets 34. The fluid distribution manifold 14 further includes manifold outlet passages 42 which connect between the respective pump outlets 36 and discharge outlets 44 of guns 16 by way of a fluid passage 46 within each gun 16, schematically shown in FIG. 2. Although passages 42 are shown angled in FIG. 1, they may also be oriented perpendicular to guns 16 and gear pumps 26 to facilitate easier drilling. This would require offsetting guns 16 with respect to the associated gear pumps 26 along the length of manifold 14.

Figure 3:
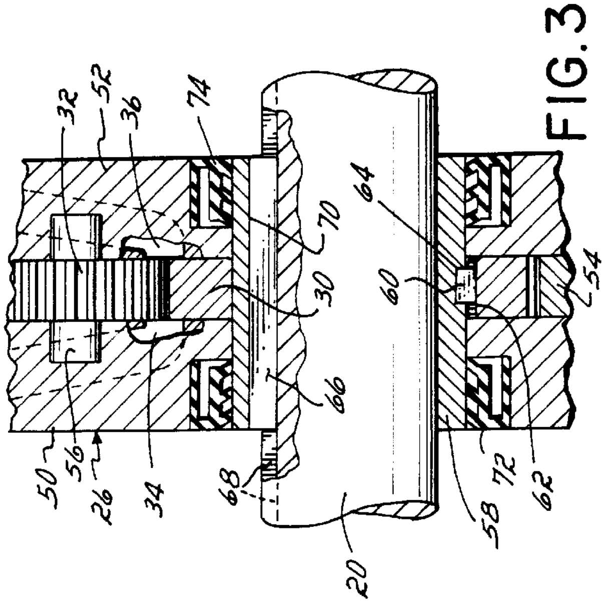
FIG. 3 is an enlarged view of the fragmented gear pump illustrated in FIG. 1 to show details of the drive, seal and gear arrangement.

Now referring to FIG. 3, each gear pump 26 more specifically comprises a pair of side plates 50, 52 which sandwich a gear plate 54 therebetween in a sealing manner to form a housing. Gear 32 is an idler gear mounted for rotation within gear plate 54 by a shaft 56. Shaft 56 is mounted for rotation within the respective side plates 50, 52. Gear 30 is a drive gear connected to rotate with a hollow shaft 58. The connection made between hollow shaft 58 and gear 30 may comprise, for example, a small key 60 contained in keyways 62, 64 respectively in drive gear 30 and an outside surface of hollow shaft 58. Hollow shaft 58 is further connected for rotation with elongated drive shaft 20 by a key 66 contained within respective keyways 68, 70 of drive shaft 20 and an inner surface of hollow shaft 58. Keyway 68 of drive shaft 20 extends along the entire length of drive shaft 20 to allow construction of gear pump assembly 12 by sliding gear pumps 26 along shaft 20 to the appropriate position lining up with passages 40, 42 of fluid distribution manifold 14. A pair of seals 72, 74 are disposed on opposite sides of first and second gears 30, 32 to prevent leakage of fluid from within gear pump 26. Specifically, these seals 72, 74 are preferably contained within the respective side plates 50, 52 and seal against an outside surface of hollow shaft 58.

The assembly process of apparatus or gearhead 10 will be best understood by reference to FIGS. 1 and 2. Initially, dispensing guns 16 and air manifold 18 may be bolted to fluid distribution manifold 14. Elongated shaft 20 may then be mounted in one journal 22. The user then slides gear pumps 26 into the positions illustrated in FIG. 1 with respect to the corresponding gear pumps 16 and fluid passages 40, 42. As mentioned above, gear pumps 26 are fastened against fluid distribution manifold 14 at these positions by bolts 28. In these positions, fluid passages 34, 40 and 36, 42 line up as shown in FIG. 2. The final step is simply to mount shaft 20 within the other journal 22 and then secure that journal 22 to air manifold 18 or another suitable support.

Referring now to FIG. 2, to dispense fluid from discharge outlet 44 of guns 16, drive shaft 20 is rotated clockwise to likewise rotate drive gear 30 and idler gear 32. This draws fluid, such as hot melt adhesive, from central supply passage 38, into gear pump supply passage 40, gear pump inlet 34 and between the meshing gears 30, 32 within housing 50, 52, 54. The fluid exits through gear pump outlet 36 and manifold outlet passages 42 into passage 46 of dispensing gun 16.

While a specific preferred embodiment has been detailed herein, those of ordinary skill in the art will recognize many modifications and substitutions of various elements which still retain the spirit and scope of the inventive concepts. For example, although the pump inlet 34 and outlet 36 are shown in different plates, these could easily be designed into only one of the side plates which may facilitate sealing with the manifold. Also, although a keyed shaft design is shown, it will be appreciated that other shaft designs, such as fluted, hexagonal, square, etc., may be utilized to accomplish the same result. Applicant therefore does not intend to be bound by the details provided but only by the legal scope of the claims appended hereto.

What is claimed is:

1. A metering gearhead dispensing apparatus comprising:

a) an elongated shaft mounted for rotation to a support; and b) a plurality of self contained metering gear pumps mounted to said elongated shaft at spaced apart locations, said metering gear pumps each including:

i) a gear body having an inlet passage and an outlet passage; and ii) first and second gears sealed within the gear body, said first and second gears being engaged with each other and mounted for rotation within said body, said first gear being connected for rotation to said elongated shaft and said inlet passage and said outlet passage leading to a space between the first and second gears whereby rotation of said elongated shaft rotates said first and second gears to pump fluid from said inlet passage to said outlet passage.

2. The apparatus of claim 1 wherein the outlets of said metering gear pumps are connected to respective, spaced apart fluid dispensers.

3. The apparatus of claim 2 wherein said fluid dispensers are mounted to a support at substantially the same spaced apart locations as the gear pumps.

4. The apparatus of claim 3 wherein the support comprises a fluid distribution manifold having fluid passages leading between the gear pumps and the fluid dispensers.

5. The apparatus of claim 1 wherein each gear pump further includes:

a hollow shaft extending through said first gear and connected for rotation therewith, said hollow shaft further being connected for rotation with said elongated shaft.

6. The apparatus of claim 5 wherein the hollow shaft is connected by a key and keyway to said elongated shaft to allow sliding movement of the gear pump along the elongated shaft.

7. The apparatus of claim 5 further comprising a pair of seals disposed on opposite sides of said first gear and each engaging said body and said hollow shaft for preventing fluid leakage from said body.

8. A metering gearhead dispensing apparatus comprising:

a) an elongated shaft mounted for rotation to a support;

b) a plurality of metering gear pumps mounted to said elongated shaft, said metering gear pumps each including:

i) a gear body having an inlet passage and an outlet passage;

ii) first and second gears in engagement with each other and mounted for rotation within said body, said first and second gears being operable to pump fluid from said inlet passage to said outlet passage; and c) a manifold connected to the plurality of metering gear pumps, said manifold having a central supply passage, a plurality of gear pump supply passages and a plurality of outlet passages with dispensing orifices, the gear pump supply passages extending between said central supply passage and the respective inlet passages of said gear pumps and the plurality of outlet passages of said manifold respectively extending between the outlet passages of said gear pumps and the dispensing orifices of said manifold.

9. The apparatus of claim 8 further comprising:

a plurality of dispensing modules connected to said manifold, each dispensing module being in fluid communication with a dispensing orifice.

10. The apparatus of claim 8 wherein each gear pump body is formed from two side plates and an intermediate gear plate, the gear plate receiving said first and second gears and the side plates respectively having the inlet and outlet passages of said body therein.

11. The apparatus of claim 10 wherein each gear pump further comprises:

a hollow shaft extending through said first gear and connected for rotation therewith, said hollow shaft further being connected for rotation with said elongated shaft.

12. The apparatus of claim 11 wherein the hollow shaft is connected by a key and keyway to said elongated shaft for allowing sliding movement of the gear pump along the elongated shaft.

13. The apparatus of claim 11 further comprising a pair of seals disposed on opposite sides of said first gear and each engaging one of said side plates and said hollow shaft for preventing fluid leakage from said gear body.

14. The apparatus of claim 8 wherein each gear pump further comprises:

a hollow shaft extending through said first gear and connected for rotation therewith, said hollow shaft further being connected for rotation with said elongated shaft.

15. The apparatus of claim 14 wherein the hollow shaft is connected by a key and keyway to said elongated shaft for allowing sliding movement of the gear pump along the elongated shaft.

16. The apparatus of claim 14 further comprising a pair of seals disposed on opposite sides of said first gear and engaging said hollow shaft for preventing fluid leakage from said gear body.

17. A metering gearhead dispensing apparatus comprising:

a) an elongated shaft mounted for rotation to a support;

b) a plurality of metering gear pumps mounted to said elongated shaft, said metering gear pumps each including:

i) a gear body having an inlet passage and an outlet passage;

ii) a first, drive gear and a second gear in engagement with each other and mounted for rotation within said body, said first gear receiving said elongated shaft and connected for rotation therewith, whereby driving said first gear rotates the first and second gears to pump fluid from said inlet passage to said outlet passage; and iii) a hollow shaft disposed between said first gear and said elongated shaft in a manner allowing transfer of rotation from said elongated shaft to said first gear.

18. The apparatus of claim 17 wherein each gear body is formed from two side plates and an intermediate gear plate, the intermediate gear plate receiving said first and second gears and the side plates respectively having the inlet and outlet passages of said body therein.

19. The apparatus of claim 18 wherein the hollow shaft is connected by a key and keyway to said elongated shaft for allowing sliding movement of the gear pump along the elongated shaft.

20. The apparatus of claim 18 further comprising a pair of seals disposed on opposite sides of said first gear and each engaging one of said side plates and said hollow shaft for preventing fluid leakage from said gear body.

21. The apparatus of claim 17 further comprising a pair of seals disposed on opposite sides of said first gear and engaging said hollow shaft for preventing fluid leakage from said gear body.

22. A gear pump adapted to be slidably positioned along a rotatable drive shaft, said pump comprising:

a gear body having an inlet passage and an outlet passage;

a first, drive gear and a second gear in engagement with each other and mounted for rotation within said gear body, said first gear adapted to receive the drive shaft and rotate therewith, whereby driving said first and second gears operates to pump fluid from said inlet passage to said outlet passage; and a rotation transferring shaft disposed in the gear body so as to operate between said first gear and said drive shaft to transfer rotation from said drive shaft to said first gear.

23. The gear pump of claim 22 further comprising a key and keyway for connecting the rotation transferring shaft to the drive shaft and for allowing sliding movement of the pump along the drive shaft.

24. The gear pump of claim 22, wherein the rotation transferring shaft is a hollow shaft and further comprising a pair of seals disposed on opposite sides of said first gear and engaging said hollow shaft for preventing fluid leakage from said gear body.

25. The gear pump of claim 22 wherein said gear body comprises two side plates and an intermediate gear plate, said intermediate gear plate receiving said first and second gears and said side plates respectively having said inlet and outlet passages of said gear body therein.

26. The gear pump of claim 25 further comprising a pair of seals disposed on opposite sides of said first gear and each engaging one of said side plates and said hollow shaft for preventing fluid leakage from said gear body.

27. A gear pump for dispensing a stream of fluid material and adapted for selective, slidable positioning on a drive shaft, said gear pump comprising:

a gear body having a drive shaft opening communicating through first and second sides thereof and an inlet passage and an outlet passage each communicating with a third side of said gear body; and a first, drive gear having an opening adapted to slidably receive the drive shaft and engaging a second gear, said first and second gears mounted for rotation within said gear body and operating to pump fluid from said inlet passage to said outlet passage;

whereby said drive shaft opening may receive the drive shaft in a sliding manner to selectively position the gear pump along the drive shaft and align said inlet passage and outlet passage with additional dispensing apparatus for said fluid material.

28. The gear pump of claim 27, further comprising sealing structure disposed on opposite sides of said drive gear for preventing leakage of said fluid material from said gear body while also allowing said gear pump to be selectively and slidably positioned on said drive shaft.

29. The gear pump of claim 28, wherein said sealing structure is connected to said gear body so as to be out of contact with said drive shaft when the drive shaft is received within the opening of the drive gear.

30. The gear pump of claim 27 further comprising a hollow shaft extending through said first gear and connected for rotation therewith, said hollow shaft further adapted to be connected to said drive shaft.

31. The gear pump of claim 30 further comprising a key and keyway for connecting the pump to the drive shaft and for allowing sliding movement of the pump along the drive shaft.

32. The gear pump of claim 27 wherein said gear body further comprises two side plates and an intermediate gear plate, said intermediate gear plate receiving said first and second gears and said side plates respectively having the inlet and outlet passages of said gear body therein.

33. The gear pump of claim 32, wherein said sealing structure further comprises a pair of seals disposed on opposite sides of said first gear and each engaging one of said side plates for preventing fluid leakage from said gear body.

34. A gear pump for dispensing a stream of fluid material and adapted for selective, slidable positioning on a drive shaft, said gear pump comprising:

a gear body having an inlet passage and an outlet passage;

a first, drive gear having an opening adapted to slidably receive the drive shaft and engaging a second gear, said first and second gears being mounted for rotation within said gear body and operating to pump fluid from said inlet passage to said outlet passage;

sealing structure disposed on opposite sides of said drive gear for preventing leakage of said fluid material from said gear body while allowing said gear pump to be selectively and slidably positioned on said drive shaft, wherein said sealing structure is connected to said gear body so as to be out of sealing contact with the drive shaft when the drive shaft is received within the opening of the drive gear.

* * * * *